United States Patent [19]

Crowne et al.

[11] Patent Number: 5,266,792
[45] Date of Patent: Nov. 30, 1993

[54] TEMPERATURE COMPENSATED OPTICAL DETECTOR

[75] Inventors: David H. Crowne, Middlebury; William B. Spillman, Jr., Charlotte, both of Vt.

[73] Assignee: Simmonds Precision Products, Inc., Akron, Ohio

[21] Appl. No.: 783,503

[22] Filed: Oct. 28, 1991

[51] Int. Cl.$^5$ ............................................. H01J 40/14
[52] U.S. Cl. ................................ 250/214 C; 250/239; 250/226
[58] Field of Search ............... 250/214 R, 214 C, 226, 250/239; 356/406, 407, 405

[56] References Cited

U.S. PATENT DOCUMENTS

| | | |
|---|---|---|
| 4,011,016 | 3/1977 | Layne et al. . |
| 4,327,416 | 4/1982 | Jerrim . |
| 4,579,461 | 4/1986 | Rudolph . |
| 4,715,003 | 12/1987 | Keller et al. . |
| 4,778,988 | 10/1988 | Henderson .......................... 250/226 |
| 4,790,669 | 12/1988 | Christensen . |
| 4,797,546 | 1/1989 | Berger et al. . |
| 4,804,833 | 2/1989 | Matsubara et al. . |
| 4,823,185 | 4/1989 | Miyamoto et al. ................. 250/226 |
| 4,912,468 | 3/1990 | Rust . |
| 4,917,500 | 4/1990 | Lugos .................................... 250/226 |
| 4,980,847 | 12/1990 | Hirano . |
| 4,986,665 | 1/1991 | Yamanishi et al. . |
| 5,024,535 | 6/1991 | Winston, Jr. . |

FOREIGN PATENT DOCUMENTS 63-286728 11/1988 Japan .

OTHER PUBLICATIONS

Jones, Barry E. "Optical fibre sensors and system for industry." *The Institute of Physics*, 1985, pp. 770-782.

*Primary Examiner*—David C. Nelms
*Attorney, Agent, or Firm*—David M. Ronyak; Leonard L. Lewis

[57] ABSTRACT

An optical wavelength detector includes a photoelectric device that produces a signal in response to incident light thereon corresponding to a characteristic of the incident light such as wavelength. A light source is provided that can selectively expose light to the photoelectric device. A memory device stores device characterization data that corresponds wavelength information to current ratio signals from the photoelectric device. The current ratio signals are digitized and form part of the address for the memory. In a temperature compensated embodiment, the optical wavelength detector includes means to determine a temperature dependent electrical characteristic of the photoelectric device. In the preferred embodiment this electrical characteristic is the forward bias voltage detected when a predetermined forward bias current is applied to the photoelectric device in the dark. The temperature dependent forward bias voltage is converted to a digital signal and provides another part of the digital address for the memory. The memory generates a temperature compensated signal that corresponds to the incident light wavelength.

28 Claims, 7 Drawing Sheets

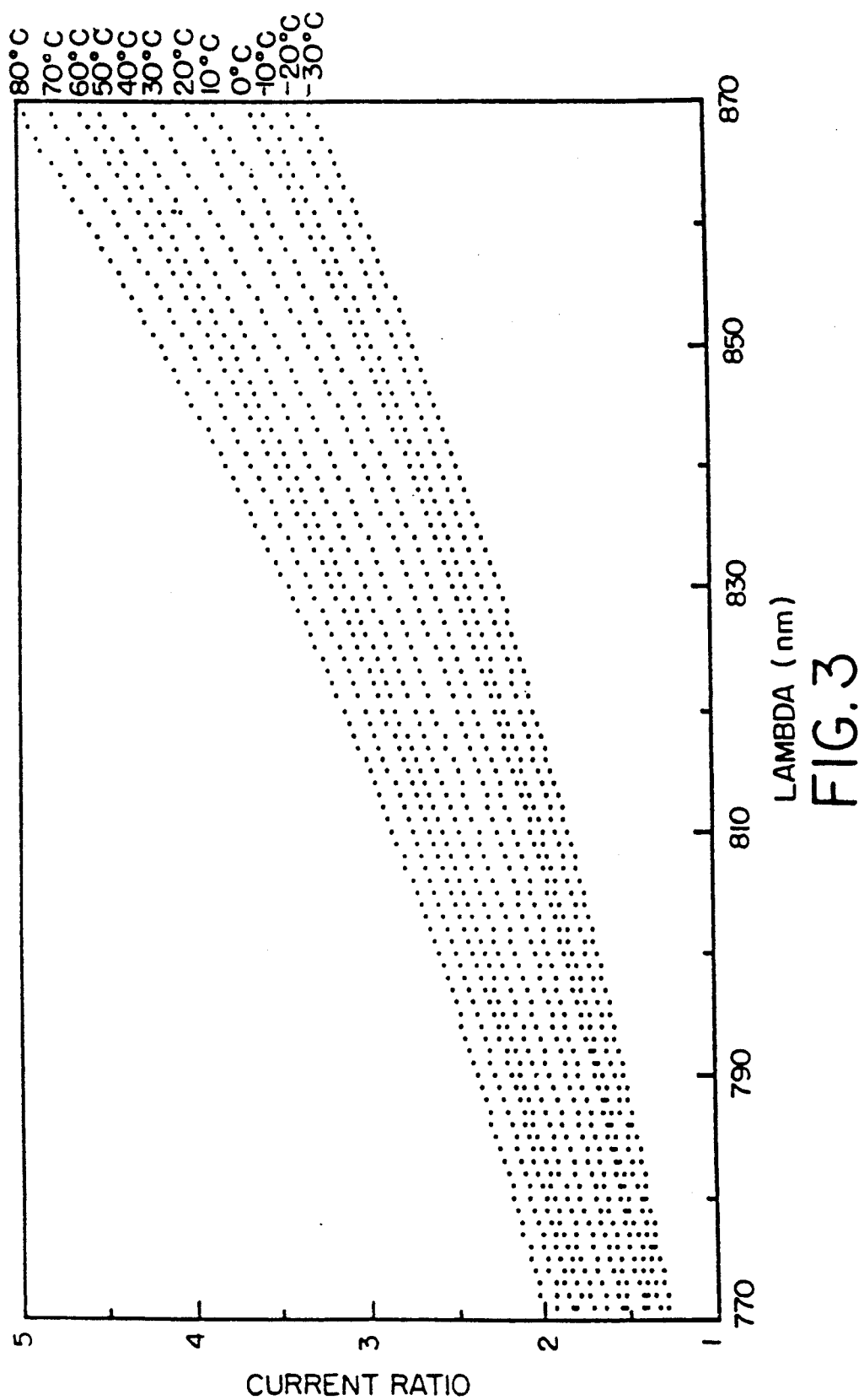

TEMPERATURE COMPENSATED OPTICAL DETECTOR

BACKGROUND OF THE INVENTION

The invention generally relates to methods and apparatus for determining wavelength of radiated light such as, for example, in spectroscopic analysis. More specifically, the invention relates to methods and apparatus for characterizing and utilizing light responsive devices including devices that have temperature-sensitive spectral responses.

Spectroscopic analysis is used in many different types of operational systems and analytical apparatus. The broadband frequency or wavelength characteristic of visible and invisible electromagnetic energy is particularly useful in sensors and analyzers subject to harsh environmental conditions and electromagnetic interference. For example, it is widely anticipated by practitioners in the aerospace industry that optics-based sensors will be widely used in next generation of military and commercial aircraft.

One of the more common techniques used for analyzing the wavelength characteristic of electromagnetic radiation is diffraction. Diffraction analysis is often feasible because many of the various components used are mechanical and thus less sensitive to temperature variations. However, such apparatus that use diffraction tend to be complex and require expensive components and critical alignments in order to provide accurate wavelength detection over a broad spectrum.

A known device useful for determining wavelength of electromagnetic radiation is commonly referred to as a color sensor. A color sensor is typically a semiconductor photoelectric device that has electrical parameters or characteristics responsive to electromagnetic energy incident on the device. The use of a color sensor has significant advantages over diffraction and other wavelength analyzers due to the sensor's simplicity, low cost and small size.

However, a significant disadvantage of semiconductor color sensors that has prevented their use in precision transducers and control devices is that color sensors are highly sensitive to the operating temperature of the device. If the ambient operating temperature of the device can be known and controlled, then a predictable relationship exists between the color sensor's output and the wavelength of incident light on the device. However, as the ambient temperature changes the entire spectral responsive curve of the color sensor also changes. For example, at 20° C. a color sensor may provide an output that corresponds to a wavelength of 835 nanometers, but the same incident light will cause an apparent wavelength reading of perhaps 845 nanometers at 30° C.

Such temperature variations are not particularly critical in applications where there is a wide tolerance for detected values. For example, if the color sensor is simply being used as a color detector where the peak wavelengths are several hundred nanometers apart, the temperature-induced shifts can easily be compensated or ignored. However, applications such as aircraft flight controls and optical sensors typically impose a much tighter requirement on detecting wavelength. Thus, an optical transducer used as part of a flight surface control may require a wavelength analyzer that can discriminate wavelength variations of only fractions of one nanometer or less. At such tight tolerances, the temperature-induced variations in a semiconductor color sensor become significant and in fact may far exceed the allowed detector tolerance. Therefore, to date, such color sensors have not been utilized in precision transducers and optical sensors subject to hostile environmental conditions, such as extreme temperature variations typically encountered in aircraft and space environments.

SUMMARY OF THE INVENTION

The present invention contemplates new methods and apparatus for analyzing electromagnetic energy, and in particular for determining wavelength characteristics of light over a broad spectral band. According to this aspect of the invention, an optical wavelength detector is provided that determines wavelength of light incident on a light sensitive device. The optical detector includes means for determining wavelength within a tolerance of 0.500 nanometer or less.

In such an optical wavelength detector according to the present invention, the light sensitive device is realized preferably in the form of a semiconductor photoelectric device such as a photodiode. According to this aspect of the invention, the use of a photoelectric device provides a low-cost, reliable, small and simple photocell for discriminating wavelength of light incident on the photocell. The photoelectric device produces an electrical output signal such as current or voltage that corresponds to wavelength and intensity of electromagnetic energy incident thereon. In a preferred embodiment of the present invention, a dual-junction photoelectric device such as a color sensor is used which provides two signals corresponding to these characteristics of the incident light. Such means are provided for taking a ratio of these signals so that the optical detector output corresponds to the wavelength characteristic of the incident light but is not dependent on the intensity of the impinging light.

The present invention further contemplates a convenient optical wavelength detector that uses a light response characteristic look-up table of optical signals produced by a photoelectric device. According to this aspect of the invention, the optical signals of a photoelectric device across a broad spectral band at predetermined increments such as one nanometer are digitized and stored in a memory device such as a read-only-memory (ROM). The optical detector includes an analog-to-digital converter (A/D) that receives the output signal from the photoelectric device and converts that signal to a digital address. In the preferred embodiment, the A/D converter uses the ratio of optical signals from a dual junction color sensor as the analog input. The digital address is directly inputted to the memory address lines, and the memory produces from the look-up table a detector output in response to the digital address. In a preferred embodiment, the output corresponds to the wavelength of the incident light on the photoelectric device. The optical detector thus is realized with a circuit according to the present invention that provides an accurate indication of the incident light wavelength without the use of a microprocessor, software or other complex control circuitry.

The present invention further contemplates an optical detector that utilizes a semiconductor-type photoelectric device, but that automatically compensates for ambient operating temperature variations of the photoelectric device. According to this aspect of the invention, the characterization look-up table is generated by obtaining optical output signals from the photoelectric device across a broad spectral band at one nanometer increments or other incremental tolerance as required. The spectral scan is performed at different controlled operating temperatures for the photoelectric device and then the data is stored in an electrically addressable memory device. Thus, the memory stores groups of correspondence or characterization data that relates optical output signals of the photoelectric device with a characteristic of light such as the wavelength. Each group, however, further corresponds to characterization data obtained at a particular operating temperature of the device. Therefore, when addressing the memory the correct wavelength data is accessed by using the group of data that corresponds to the operating temperature of the photoelectric device.

The invention further provides methods and apparatus for accurately determining a temperature compensated characteristic of light incident on the photoelectric device such as wavelength. According to this aspect of the invention, the device characterization optical response data is stored in memory, grouped by various operating temperatures of the device. In order to determine accurately the operating temperature of the photoelectric device, the optical detector according to the invention includes means for determining a temperature dependent electrical parameter of the photoelectric device. In the preferred embodiment, the incident light exposed to the photoelectric device is interrupted so that the device is momentarily dark. During this dark period of time a fixed predetermined current is applied to the photoelectric device and the forward bias voltage is measured This voltage level corresponds to the operating temperature of the device. An analog-to-digital conversion is performed on the sensed voltage and the resulting digital signal is used as part of the digital address for the memory. Because there is only one digital address for each operating temperature of the photoelectric device, the appropriate group of characterization data is accessed from the memory. Thus, the digital address formed by the combination of the digitized forward bias voltage and the digitized optical response can be directly used to access the appropriate temperature compensated characterization data from the look-up table stored in memory.

The invention further contemplates an apparatus and method for determining a temperature compensated characteristic of incident light on a photoelectric device using a linear extrapolation technique. According to this aspect of the invention, the optical response of the photoelectric device is modified or offset by a correction factor that corresponds to the operating temperature of the device. The operating temperature is determined in the aforementioned preferred manner by applying a known current to the dark photoelectric device and sensing the forward bias voltage. This temperature-dependent electrical parameter corresponds to the device operating temperature and can be used to provide an offset for the optical response of the photoelectric device. This embodiment of the invention is simpler in that it obviates the need for a memory and related circuitry. The tradeoff, of course, is slightly lower accuracy due to the use of linear approximation Apparatus and methods used in accordance with the present invention provide a convenient, precise, reliable and cost effective optical detector that is fully temperature compensated over a broad temperature range and light spectrum. All components of such apparatus are conventional and commercially available. Because a conventional color sensor can be used as the optical responsive device, an optical detector according to the invention can conveniently be combined for use with optical sensors using standard optic fibers.

These and other aspects and advantages of the present invention will be appreciated and understood by those skilled in the art from the following detailed description of the preferred embodiments in view of the accompanying drawings.

BRIEF DESCRIPTION OF THE DRAWINGS

FIG. 2b is an approximated representation of current ratio versus wavelength for the spectral response curve of FIG. 2a;

FIG. 3 is a chart of data showing a family of curves for current ratio versus wavelength for twelve operating temperature settings for the color sensor of FIGS. 2a and 2b;

DETAILED DESCRIPTION OF THE PREFERRED AND ALTERNATIVE EMBODIMENTS

A. General Description of Operation

An important advantage of the present invention is that it provides method and means for detecting a characteristic of light such as wavelength using a conventional semiconductor photoelectric device. Heretofore, these devices have been generally unusable in hostile environments because such devices have optical responses that are extremely sensitive to their ambient operating temperature. While the invention is described herein with specific reference to a photoelectric device commonly known in the art as a color sensor, such description is for purposes of explanation only and should not be construed in a limiting sense. Those skilled in the art will readily appreciate that the advantages and results of the invention can be realized by use of a variety of different types of electromagnetic energy detectors that produce an output that corresponds to one or more characteristics of light incident on the device. That is, the photoelectric device preferably is responsive to modification or modulation of a portion of the electromagnetic spectrum, and preferably generates a single peak type response over the spectral band being utilized in a specific application of the invention. Furthermore, the invention is not limited to the detection of wavelength characteristics though this is a particularly useful aspect of the invention.

As used herein the term "light" is intended to be understood in its broadest sense to include all electromagnetic radiation in the visible and invisible spectrum. There is no inherent limitation, for example, of the wavelength to be detected provided there is available a detector capable of discriminating various wavelengths of light. In addition, the terms "photoelectric device", "photocell" and "photodiode" are used interchangeably to refer to any semiconductor type device that has a detectable parameter that changes in response to one or more characteristics of light incident thereon.

Figure 1:
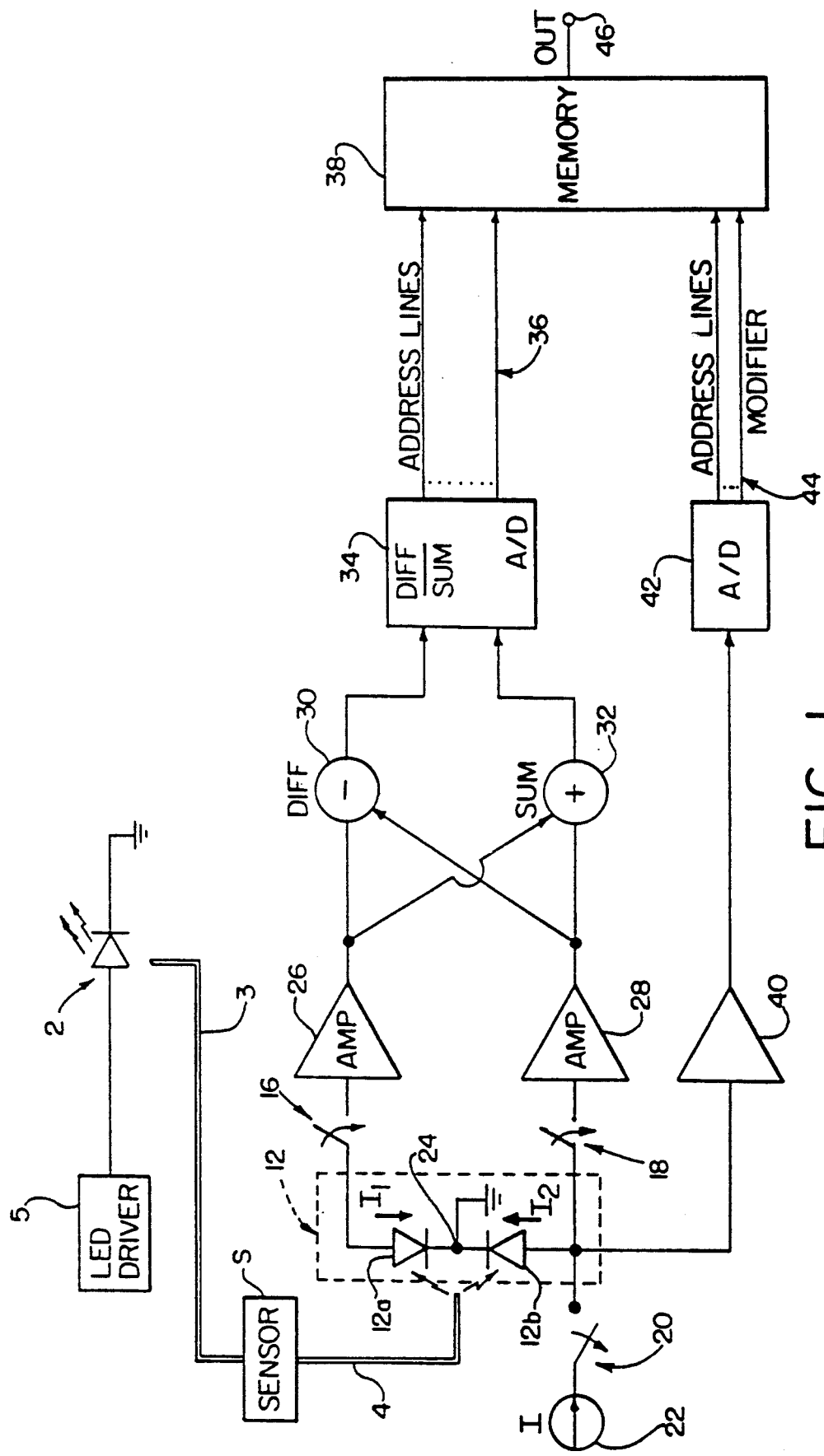
FIG. 1 is a simplified functional block diagram of an optical detector according to the present invention.

With reference to FIG. 1, an optical detector circuit in accordance with the present invention is generally indicated by the reference numeral 10. The invention is particularly useful for detecting wavelength of light used in an optical transducer or similar device, however, those skilled in the art will understand that the present invention is useful in a variety of applications involving the need to detect a characteristic of electromagnetic radiation using a photoelectric device. For example, the circuit 10 is particularly suited for use with a sensor S such as a linear position encoder that receives light from a light emitting diode 2 through an optic fiber 3. Of course, other light emitting devices can be used with the invention so long as the spectrum emitted can be detected by an appropriate photosensitive device. The sensor S modulates, diffracts or otherwise discriminates one or more characteristics of the light received through the optic fiber 3 and transmits the modified light through a second optic fiber 4 to the circuit 10. The embodiments of the invention described herein will be in reference to use of the invention to detect wavelength of light, however, other parameters may be used.

In order to realize a low-cost yet precise method and apparatus for detecting wavelength, a semiconductor photoelectric device 12 is used with the circuit 10. The photoelectric device 12 is preferably a dual-junction semiconductor color sensor such as a PD153 device manufactured by Sharp Electronics As shown in FIG. 1, the color sensor 12 is effectively two photodiode PN-junctions 12a and 12b that are electrically in parallel and have a common cathode. The physical structure of this device is such that the PN-junctions are vertically incorporated on a substrate so that shorter wavelength light is absorbed by the photodiode closer to the substrate surface, and longer wavelength light penetrates deeper and is absorbed by the deeper photodiode, as is well known to those skilled in the art.

Figure 2A:
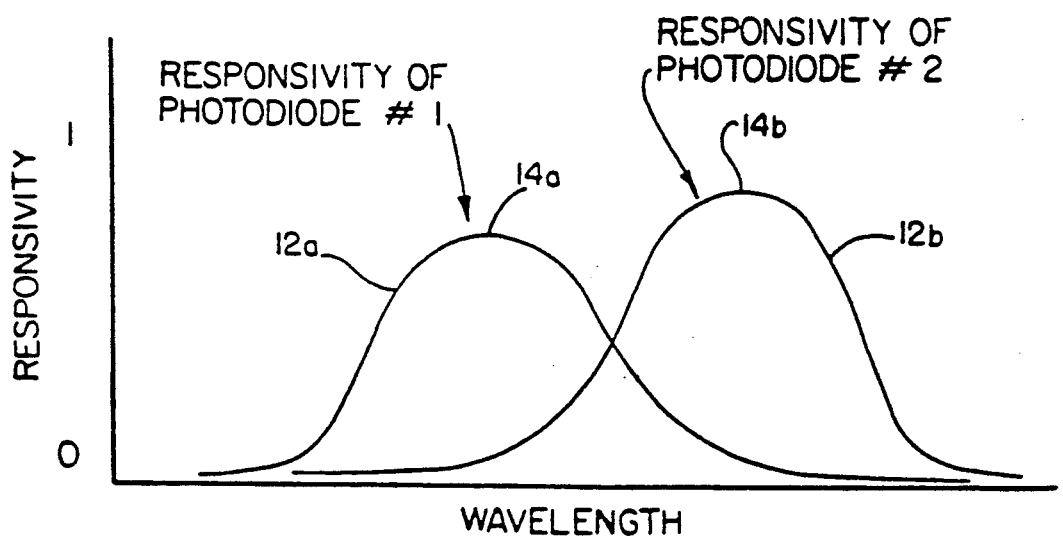
FIG. 2a is an approximated representation of a spectral response curve for a dual-junction color sensor.

As a result of this arrangement, the photodiodes 12a and 12b have separate but overlapping spectral sensitives (i.e. photoelectric responses to light). Each photodiode produces an electrical signal that is dependent upon the wavelength of light it absorbs. This optical response of the photodiodes can be detected as a current or voltage. With reference to FIG. 2a, typical electrooptic responses of the photodiodes are drawn in a somewhat idealized manner for clarity. Assume for purposes of illustration that the photodiode 12a is the shorter wavelength device and that the photodiode 12b is the longer wavelength device. The vertical axis of FIG. 2a is arbitrarily scaled but may represent, for example, the normalized current output of each device $I_1$ and $I_2$ respectively. The horizontal axis is, of course, wavelength (longer wavelengths towards the right of FIG. 2a). Each device produces a peak output (maximum sensitivity) at a particular wavelength 14a and 14b respectively. The response curves then fall off on either side of these peaks in a known predictable manner. However, there is a substantial overlap of the spectral curves.

Figure 2B:
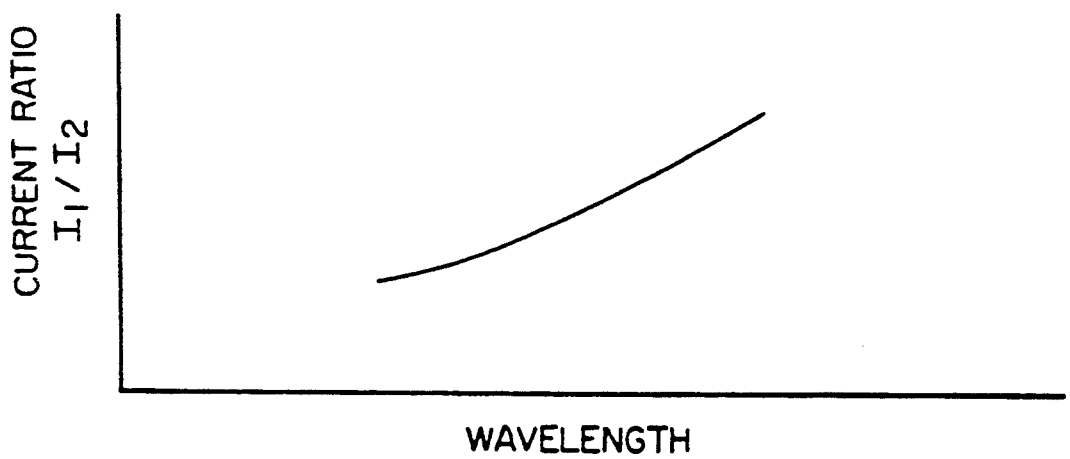

FIG. 2b illustrates, again in a rather idealized manner, the result of taking a ratio of the currents produced by the devices 12a and 12b (from FIG. 2a) versus wavelength. As shown, the ratio of currents is a monotonic function that is related to wavelength over the spectral response band of the photodiodes For the PD153 photoelectric device, this band is about 700-900 nanometers. Other available color sensor devices have different wavelength sensitivities as may be required for different applications. Thus, under stable operating temperature conditions, the PD153 alone is a fairly accurate device for determining wavelength of light incident thereon. Furthermore, the linearity of the response can be improved by using a difference over sum ratio, $(I_1-I)/(I_1+I_2)$, rather than simply $I_1/I_2$. Using either ratio provides the added benefit that the ratio value is insensitive to changes in the amplitude or intensity of the light impinging on the devices 12a and 12b.

Like all semiconductor-type devices, however, the color sensor is extremely sensitive to operating temperature. FIG. 3 illustrates a graph of data obtained by plotting current ratio versus wavelength for twelve (12) different operating temperatures of the PD153 photoelectric device. A family of curves is generated, but note that the response curves generally shift in a uniform and predictable manner. Also, the generally linear relationship between the current ratio and wavelength is fairly constant. The shifts due to temperature variation, however, are significant and have prevented utilizing such devices in applications where the operating temperature of the devices is :not or cannot be tightly controlled. An important advantage of the present invention is that it provides temperature compensation and thus allows these devices to be utilized in many applications.

Figure 4:
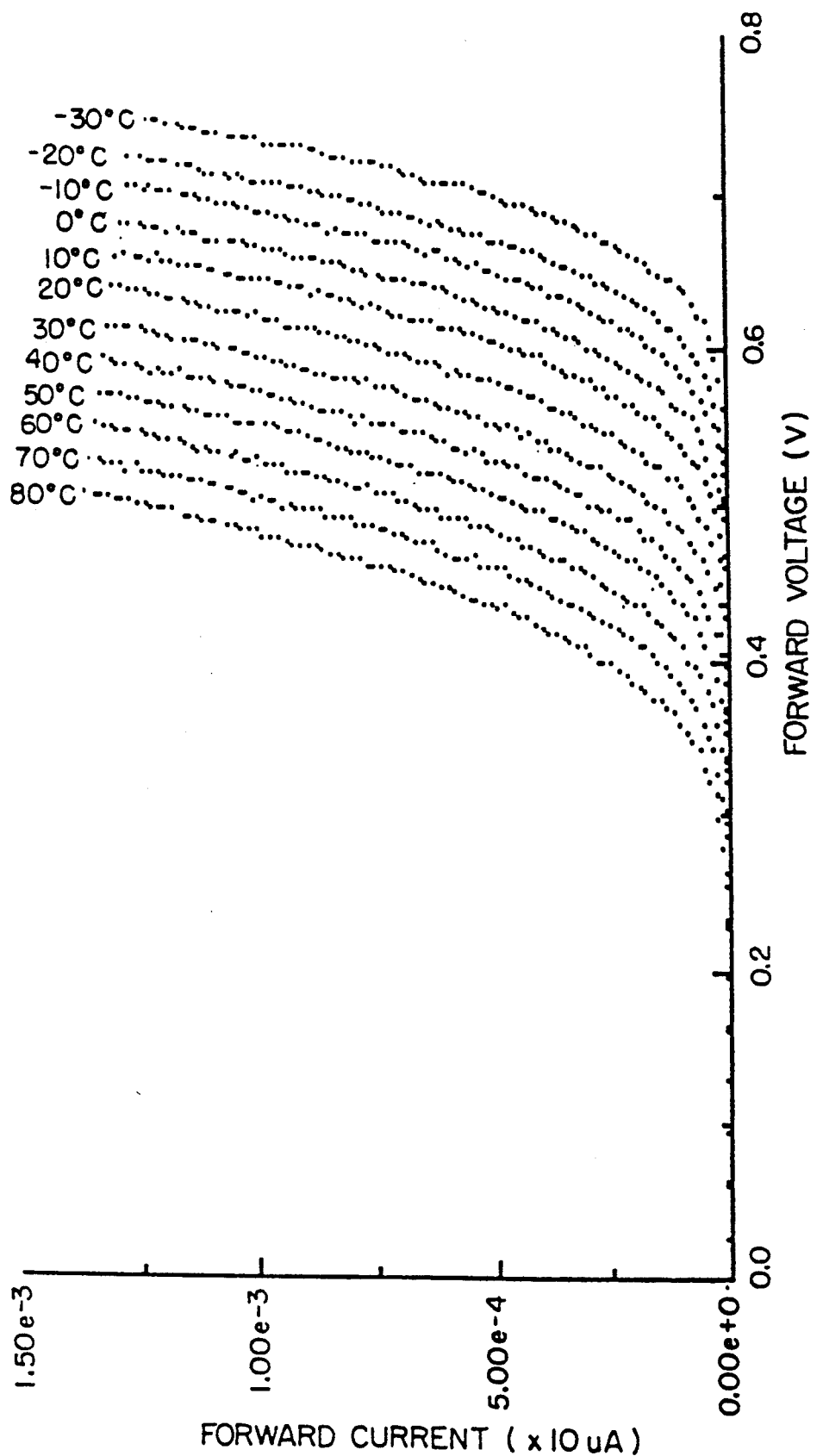
FIG. 4 is a chart of data showing a family of curves for forward bias current versus forward bias voltage for twelve operating temperature settings of the color sensor of FIGS. 2a and 2b.

In order to provide temperature compensation, it is necessary to determine the operating temperature of the photoelectric device 12. Another important aspect of the invention is that it provides a convenient and accurate way to determine the actual operating temperature of the photoelectric device without using a separate sensor or device. FIG. 4 is a graphical representation of data obtained by plotting forward bias current (vertical axis) versus forward bias voltage (horizontal axis) over a range of temperatures for one of the photocells 12a or 12b. Each individual graph is, of course, the standard forward bias voltage curve for a PN-junction where current increases exponentially when the device is biased beyond the threshold voltage of the junction (typically about 0.6 VDC). The useful result, however, is that the curves shift in a predictable and rather uniform manner with temperature and thus provide a useful family of curves across a broad temperature band. The data for the curves in FIG. 4 was obtained using only one of the two junctions in the color sensor 12, and with no light incident on the device to avoid the effects of photoelectric currents. Thus, by applying a predetermined forward bias current and detecting the forward bias voltage (or vice-versa applying a known forward bias voltage and detecting the resulting current), the operating temperature characteristic of the photoelectric device 12 can be precisely determined. Of course, other electrical characteristics of the photoelectric device 12 are temperature dependent and could be used in lieu of determining the forward bias voltage.

B. Detailed Description of the Preferred Embodiment

Referring again to FIG. 1, the temperature compensated detector circuit 10 includes a first selector switch 16 in series with the photoelectric device 12 and a second selector switch 1S also in series with the photoelectric device 12 on the opposite side of the first switch 16. The switches 16 and 18 may be mechanical or electronic such as an FET switch and are actuated together by control logic drivers (not shown in FIG. 1).

The switches 16, 18 are either both open or both closed. A current switch 20 is also connected in series with the photocell 12 and is used to selectively control the connection of a constant current source 22 to the photocell 12. The current switch 20 may conveniently be the same type as the selector switches 16, 18 and utilize the same control logic circuitry. However, the current switch 20 is closed only when the selector switches 16, 18 are both open, and when the selector switches 16, 18 are closed the current switch 20 is open.

The switch control logic also controls actuation of a light emitter such as an LED 2 through an LED driver circuit 5. When the current switch 20 is closed, the LED driver 5 is deactivated so that no light is emitted to the photocell 12 via the sensor 5. When the current switch 20 is open (and the selector switches 16, 18 are closed) the LED driver 5 is energized and light is transmitted by the optic fibers 3, 4 to the sensor 5 and photocell 12 as described hereinabove.

The common cathode 24 of the dual-junction photocell 12 is connected to ground potential. The selector switch 16 when closed connects the photocell 12a anode in series with a current-to-voltage gain amplifier 24. In the preferred embodiment, the photoelectric device 12 is used in its photocurrent mode whereby each photocell 12a, 12b conducts current in response to the wavelength of light incident thereon. Alternatively, of course, the device 12 could be used in a photovoltaic mode in which case the amplifier 26 would be configured as a voltage gain amplifier.

Similarly, the selector switch 18 when closed connects the photocell 12b anode in series with another current-to-voltage converter 28.

The voltage outputs of the converters 26, 28 correspond to the current generated by the photoelectric junctions 12a, 12b and hence to the wavelength of the incident light. A summing circuit 20 is used to add the respective outputs from the amplifiers 26, 28 and a difference circuit 32 is used to subtract the outputs from the amplifiers 26, 28. The ratio of the difference over sum outputs of the circuits 30, 32 is determined by a ratio circuit 34. The ratio circuit 34 also preferably and conveniently is used to convert the analog ratio to a digital word address 36 having 12 bits per word. The number of bits used for the analog-to-digital conversion is, of course, a matter of design choice.

The digitized ratio output from the ratio circuit 34 is directly connected to input address lines of a memory device 38. The memory device 38 can be any conventional digital memory such as a read-only-memory (ROM), a programmable read-only-memory (PROM), and electrically erasable programmable read-only-memory (EEPROM) and so on. As will be explained shortly, the address bits received by the memory 38 from the ratio circuit 34 are part but not all of a complete address needed to access data.

The anode of one of the dual photocells (12b in FIG. 1) is connected to the input of a voltage follower or buffer 40. When the current switch 20 is closed in the preferred embodiment, a predetermined forward bias current I flows through the junction 12b. The photoelectric device 12 is dark at this time because the LED 2 is deenergized. A forward bias voltage is developed across the PN-junction as explained hereinabove with respect to FIG. 4. This voltage is buffered by the voltage follower 40 and converted to a binary (four bit) word by a another analog-to-digital converter 42. The digitized output 44 of the second A/D converter 42 is connected to additional input address lines of the memory device 38. The combination of address bits from the ratio circuit 34 and the second A/D circuit 42 provide a complete word address for accessing data from the memory 38.

Other temperature dependent electrical characteristics of the photoelectric device 12 could also be used. For example, it is known that the reverse bias leakage current of a PN-junction changes with temperature in a predictable manner.

The output of the second A/D converter 42 corresponds to the operating temperature of the photoelectric device 12 as explained hereinbefore with respect to FIG. 4. Therefore, the digital address portion provided by the detected temperature dependent electrical characteristic of the photoelectric device 12 provides a direct indication of the operating temperature of the device and can be used to access the correct temperature compensated data from the memory 38.

In the preferred embodiment, the memory 38 is used to store a look-up table of characterization data of the photoelectric device 12. More specifically, in the example being described herein, the look-up table contains the corresponding temperature compensated wavelength data for the device 12 optical output signals. For example, assume that the measured forward voltage across junction 12b of the dark device 12 corresponds to a device temperature of 30° C. This voltage results in a unique address from the second A/D converter 44. This temperature based address enables access to wavelength data stored in the memory 38 for that particular operating temperature of 30° C. If, as another example, the measured forward bias voltage corresponded to a device 12 temperature of 35° C., the second A/D converter 42 generates a different unique address to the memory 38. This address would enable access to the temperature compensated wavelength data for the operating temperature of 30° C.

The memory 38 thus stores the temperature compensated wavelength data in groups with each group corresponding to one of the current ratio versus wavelength curves for a particular operating temperature. The memory 38 is preferably non-volatile so that power to the circuit 10 can be disconnected without losing the data stored in memory.

The wavelength characterization data for the look-up table can be obtained by using a slightly modified version of the circuit of FIG. 1 in a controlled environment. In place of the LED 2, a variable wavelength light source is used that can scan over the desired spectral band used by the sensor 5 in increments within the desired level of discrimination, for example, one (1) nanometer increments. The temperature of the device is controlled in an environmental chamber to the desired degree of accuracy. The forward voltage measurement produces the temperature address 44 and at each incremental wavelength the ratio circuit 34 provides an address corresponding to the input light wavelength based on the optical output of the photoelectric device 12. A programming device (not shown) is then used to enter the appropriate data in memory 38 at the address location corresponding to the operating temperature and wavelength. This process is carried out for all wavelengths at the controlled temperature. Then the temperature of the device 12 is changed to the next desired level and the wavelength scan repeated and so on until there is developed a complete look-up table for all expected wavelength measurements at all expected operating temperatures.

As an example, assume that monochromatic light of an unknown wavelength is incident on the photoelectric device 12. The device 12 produces currents through the junctions 12a and 12b, and the ratio of those currents corresponds to the wavelength of the light (as explained with reference to FIG. 3). The current ratio is converted to the digital address 36 for the memory 38 by the ratio circuit 34. The light is momentarily interrupted and the temperature dependent forward bias voltage is measured and converted to a digital address 44. The temperature-based address 44 enables access to the stored data points obtained during the characterization sequence used to generate the look-up table for the corresponding temperature. It is analogous to selecting one of the curves from the family of curves in FIG. 3 as the set of data points. The ratio circuit address 36 in combination with the temperature based address 44 causes the memory to output data 46 that corresponds to the wavelength of the light based on the digitized ratio value from circuit 34 for the operating temperature identified by the output from the second A/D 42.

An important aspect of the invention is that the circuit 10 provides a fully temperature compensated wavelength output 46 for the color sensor 12 without the need for complicated control logic or a microprocessor. The look-up table stored in the memory 38 is directly accessed using digitized data from the optical output of the photoelectric device 12 and the temperature dependent electrical characteristic of the same device 12. The memory 38 produces the output 46 at one or more output lines 39. This output can then be used in other signal processing circuitry (not shown) as required in a specific application.

Although in the preferred embodiment the memory 38 is used to store temperature compensated wavelength data, alternatively the memory could store a correction factor that is then used to adjust the current ratio reading from the ratio circuit 34 to provide a temperature compensated value that corresponds to the wavelength of the incident light. In yet another alternative, the forward bias voltage measurement that corresponds to the device 12 temperature could be used as an offset to adjust the current ratio signal using a simpler linear extrapolation technique. This latter approach could obviate the need for a memory device, although a linearization circuit would be needed to properly offset the current ratio in relation to the device temperature resulting in a temperature compensated wavelength signal.

Figure 5:
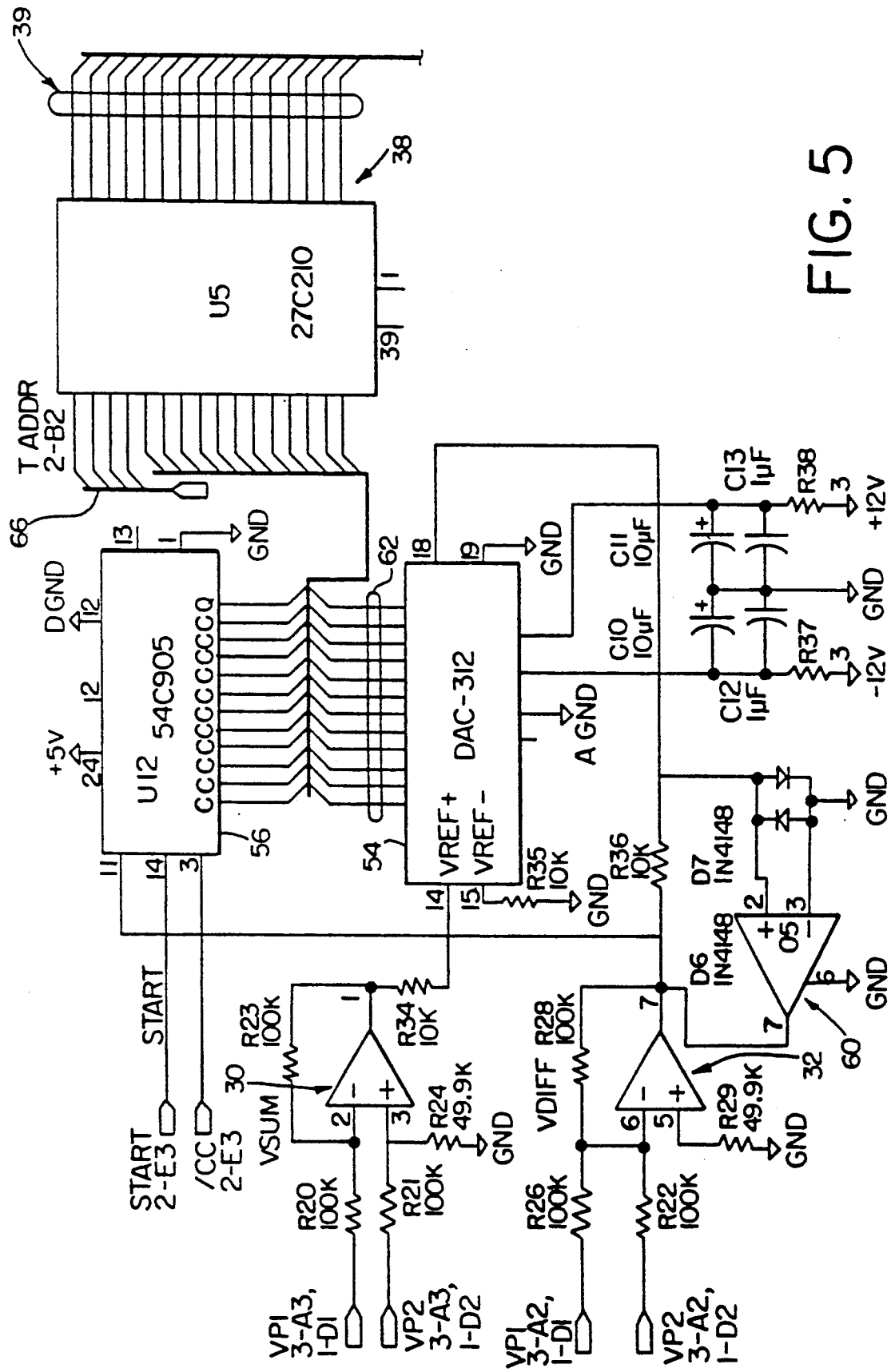
FIG. 5 is a detailed schematic of a ratio circuit and memory device preferably used in the optical detector of FIG. 1.
Figure 6:
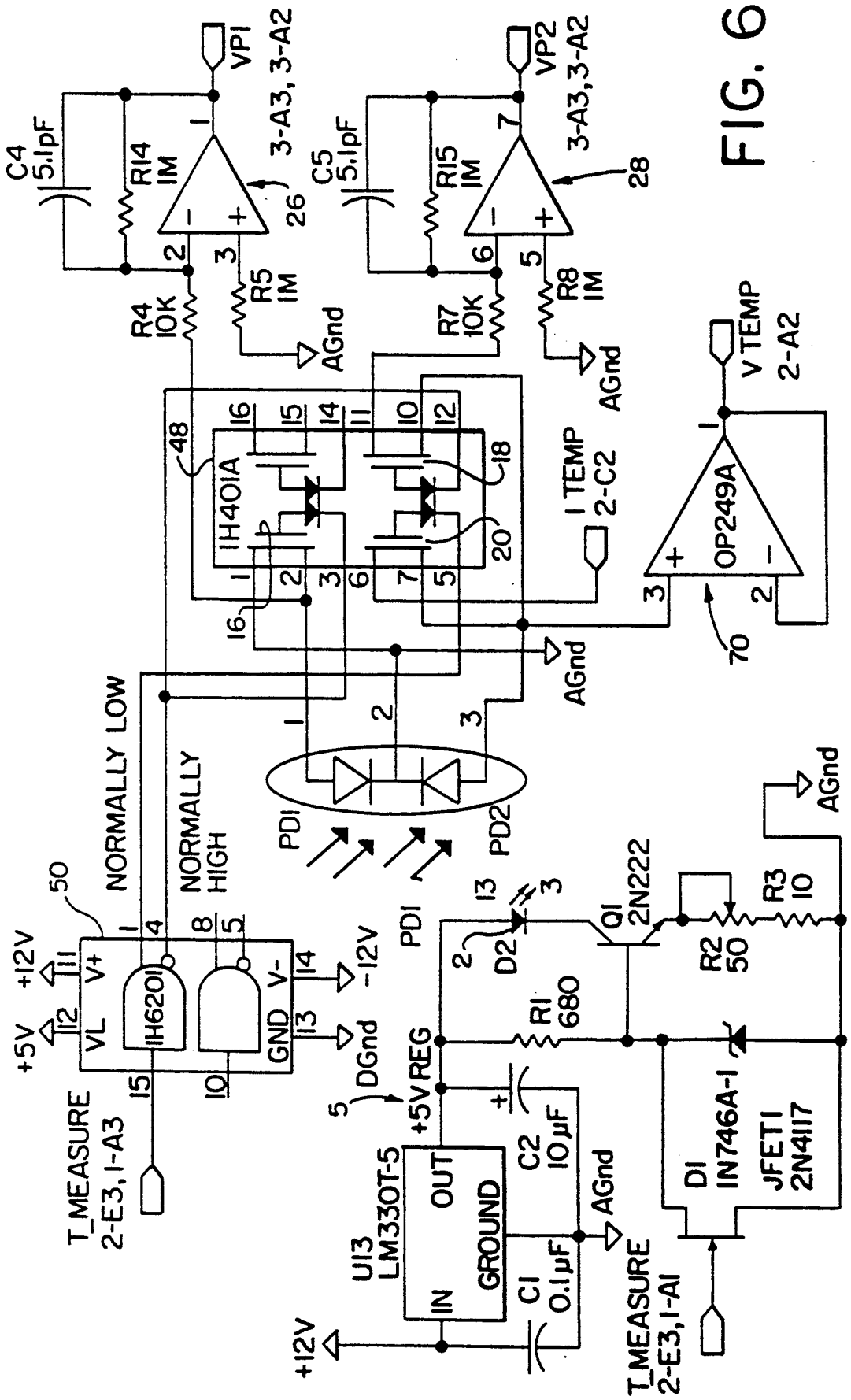
FIG. 6 is a detailed schematic of an LED device driver circuit, electronic switching circuit and current to voltage converters preferred for use in the optical detector circuit of FIG. 1.
Figure 7:
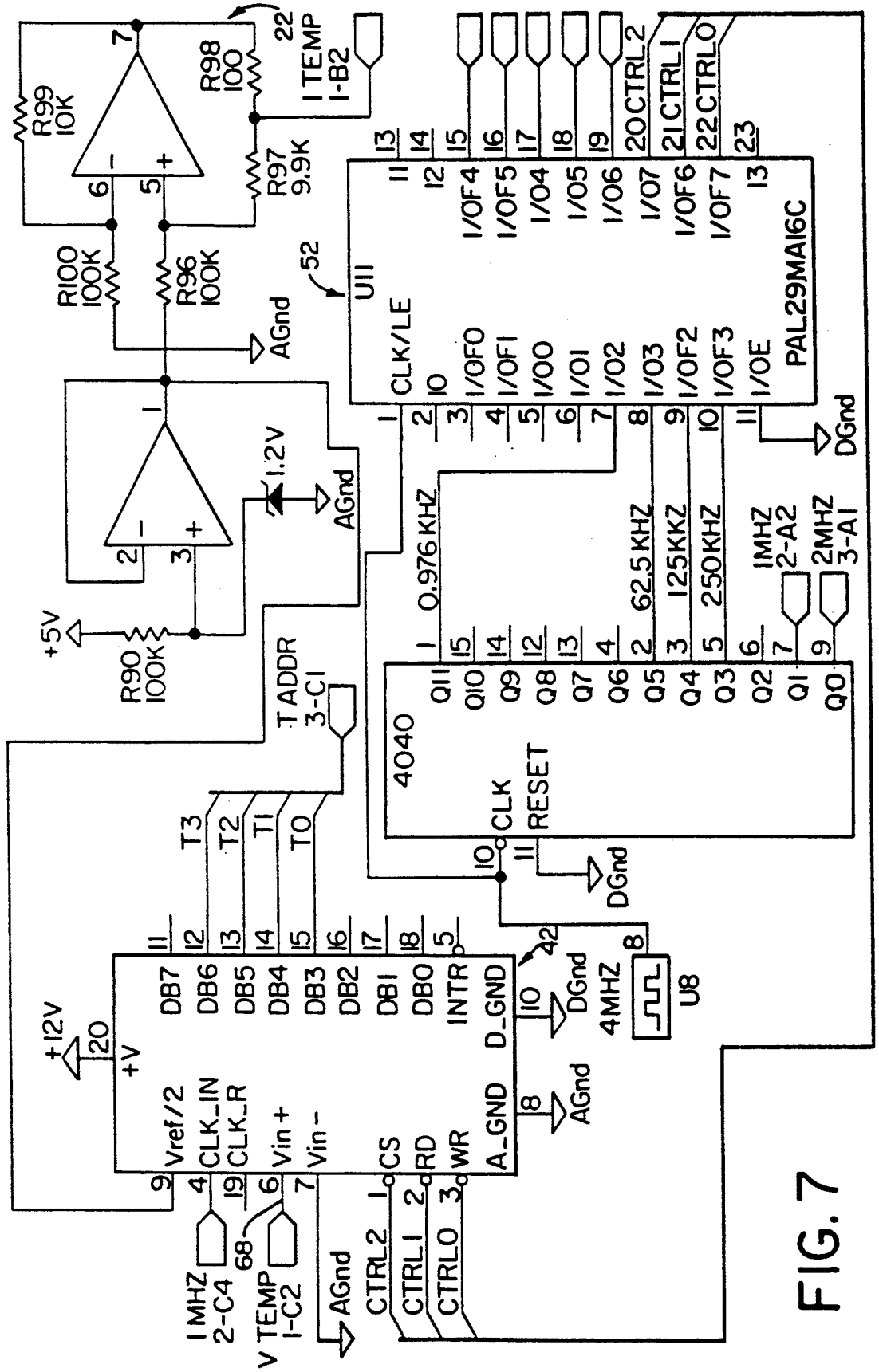
FIG. 7 is a detailed schematic of a constant current source and A/D converter and control logic circuits preferred for use with the optical detector circuit of FIG. 1.

Turning now to FIGS. 5-7 inclusive, certain details of circuits preferred for the functional blocks in FIG. 1 will now be described, it being understood that the invention can be realized and practiced in different equivalent ways and with different but equivalent circuit components.

A quad-FET switch assembly 48 (FIG. 6) is used for the switches 16, 18 and 20. The FET switches 48 are controlled by a FET switch driver 50. Note that FET gate pins 3 and 12 are actuated by a common output pin 4 from the driver 50 and the FET gate pin 5 is actuated by inverted output pin 1 of the driver 50. This causes switches 16 and 18 (FIG. 1) to operate together and in opposite manner to the current switch 20.

The current-to-voltage converters 26, 28 are realized by respective operational amplifiers functioning in a current sensing configuration. A conventional LED driver circuit 5 is provided for selectively activating the LED 2. With reference to FIG. 7, the constant current source 22 is realized with a Howland current pump circuit, a design well known to those skilled in the art. A PAL logic unit 52 (FIG. 7) is used for generating the various logic control signals needed for operation of the optical detector circuit 10.

Referring now to FIG. 5, the outputs from the current-to-voltage converters 26, 28 are inputted to the summing and substraction circuits 30, 32. Both of these circuits are realized using conventional differential amplifiers, one of which is configured as an adder and the other configured as a subtractor. The output of the adder 30 is used as a reference level to a multiplying digital-to-analog converter (MDAC) 54. A successive approximation register (SAR) 56 sequentially increments the MDAC 54 starting with the most significant bit. An analog output 58 of the MDAC 54 represents the estimated value (as a proportion of the SUM signal 30) of the difference signal from subtractor 32. A comparator 60 compares the actual difference signal to the estimated signal and enables the register 56 to continue incrementing until the values are near equality. At this point the parallel output lines 62 of the SAR 54 provide a digitized word corresponding to the ratio of the difference to the su for the optical output signals from the photoelectric device 12. The output lines 62 are latched during the interval when light is interrupted to the photocell 12. It will be appreciated by those skilled in the art that the MDAC, SAR and comparator are configured to realize in a preferred manner a ratiometric analog-to-digital converter.

The SAR output lines 62 are connected to the address input lines of a PROM 38. Another set of address lines 66 provide a 4-bit address modifier corresponding to the operating temperature of the photoelectric device 12. These temperature dependent address modifier signals are generated by the A/D converter 42 (FIG. 7) which uses an analog voltage signal 68 output from a conventional voltage follower 70 (FIG. 6). The temperature address modifier signals are latched by the converter 42 because the temperature dependent electrical characteristic is only sampled periodically. The output of the voltage follower 70 corresponds to the forward bias voltage of one of the photocells when a predetermined current from the Howland current pump 22 is applied to the dark photocell through the FET switch 20.

It will be appreciated by those skilled in the art that the invention does not require the use of a dual junction color sensor. For example, two individual photosensitive devices with overlapping spectral responsivity curves may be used.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. An optical detector comprising a photoelectric device that produces a light response signal in response to a characteristic of light incident on said device; light means for selectively exposing said device to light from a source; means for determining a temperature dependent electrical characteristic of said device that is independent of said light characteristic; and temperature compensating means that produces in response to said light response signal and said device electrical characteristic a detector output that corresponds to said light characteristic and that is compensated for operating temperature of said device.

2. An optical detector according to claim 1 wherein said electrical characteristic is a current produced by said device in response to a predetermined voltage applied to said device.

3. An optical detector according to claim 1 wherein said electrical characteristic is a voltage produced by said device in response to a predetermined current applied to said device.

4. An optical detector according to claim 3 wherein said means for determining a temperature dependent electrical characteristic of said device applies a current to said device and determines a voltage produced by said device in response to said current when said device is dark.

5. An optical detector according to claim 4 wherein said means for determining a temperature dependent electrical characteristic of said device applies a forward bias current to said device and detects a forward bias voltage produced in response thereto.

6. An optical detector according to claim 1 wherein said temperature compensating means includes a memory for storing a look-up table of temperature compensated light response data for said device.

7. An optical detector according to claim 6 wherein said temperature compensating means further includes address means that converts said temperature dependent electrical characteristic into part of an address signal for said memory and that converts said device light response signal into another part of said address signal, said memory providing an output in response to said address with said memory output, corresponding to said characteristic of the incident light.

8. An optical detector according to claim 7 wherein said look-up table corresponds wavelength of light incident on said device with said device light response signal.

9. An optical detector according to claim 8 wherein said address means includes a pair of analog-to-digital converters and said photoelectric device is a pair of photodiodes both illuminated by said light source.

10. An optical detector according to claim 9 wherein said light means includes optic fibers between said light source and said photoelectric device and further includes means for interrupting light to said photoelectric device at predetermined times.

11. An optical detector according to claim 6 wherein said look-up table contains correction data for compensating said device light response signal in relation to operating temperature of said device.

12. An optical detector according to claim 11 wherein said temperature compensating means further includes means for adjusting said device light response signal as a function of said offset data.

13. An optical detector according to claim 1 wherein said temperature compensating means includes means for adjusting said device light response signal by linear extrapolation as a function of said temperature dependent electrical characteristic.

14. A circuit for determining a characteristic of light comprising:

a light responsive device that produces a signal in response to the characteristic of incident light thereon;

a source of light exposed to said device;

addressable memory means for storing data corresponding to said light characteristic as a function of said device optical signal; and means to convert directly said device optical signal to an address for said memory means, said memory means producing in direct response to said address an output that corresponds to said characteristic of light.

15. The circuit according to claim 14 wherein said means to convert is an analog to digital converter that produces a digitized address output connected to an address input of said memory means.

16. The circuit according to claim 15 wherein said memory means is a programmable read only memory.

17. The circuit according to claim 14 wherein said stored data corresponds to wavelength of said incident light and is compensated for operating temperatures of said device.

18. The circuit according to claim 17 further comprising means to determine operating temperature of said device, wherein said means to convert modifies said address in relation to said device operating temperature.

19. The circuit according to claim 18 wherein said wavelength data is stored in groups in said memory means with each of said groups having one or more data values corresponding to wavelength of said incident light as a function of said device optical signal, each of said groups having a unique address location corresponding to operating temperature of said device.

20. The circuit according to claim 19 wherein said means to determine operating temperature of said device produces an output that forms part of an address for said memory means.

21. The circuit according to claim 20 wherein said light source includes means for interrupting light to said device during which said device operating temperature is determined.

22. A method for determining a characteristic of light comprising the steps of:

a) providing a light responsive device that produces a temperature dependent optical signal corresponding to the characteristic of incident light thereon;

b) exposing said device to incident light from a source and detecting said optical signal;

c) interrupting said incident light to said device;

d) detecting a temperature dependent electrical characteristic of the dark device; and e) compensating said optical signal as a function of said detected electrical characteristic to provide an output that corresponds to the characteristic of the incident light.

23. A method of claim 22 wherein said temperature dependent electrical characteristic is a forward bias voltage produced in response to applying a predetermined forward bias current to the dark device.

24. The method of claim 23 wherein the characteristic of light corresponds to the wavelength.

25. A method for determining a characteristic of light comprising the steps of:
   a) using a light response device to produce an output that corresponds to the light characteristic;
   b) exposing the device to light;
   c) using an addressable memory that stores a look-up table of light characteristic data as a function of the device output;
   d) directly converting the device output to an address for the memory; and
   e) producing an output from the memory in direct response to said address and that corresponds to the light characteristic.

26. The method of claim 25 wherein the light responsive device is a color sensor that produces two signals that each corresponds to wavelength of light incident on the device, further comprising the step of determining a difference over sum ratio of the two color sensor signals 27. The method of claim 25 further comprising the step of modifying said address as a function of operating temperature of the device.

28. The method of claim 27 wherein the step of storing a look-up table in the memory includes storing the light characteristic data in groups with each group having characteristic data for the device at a predetermined operating temperature.